United States Patent [19]

Ostlinning et al.

[11] 4,451,644

[45] May 29, 1984

[54] PROCESS FOR THE PRODUCTION OF POLYARYLENE (SULPHIDES) HAVING AN INCREASED THERMAL AND CHEMICAL RESISTANCE AND AN IMPROVED COLOR QUALITY

[75] Inventors: Edgar Ostlinning, Duesseldorf; Karsten Idel, Krefeld; Otto Neuner, Bergisch-Gladbach; Ludwig Bottenbruch, Krefeld, all of Fed. Rep. of Germany

[73] Assignee: Bayer Aktiengesellschaft, Leverkusen, Fed. Rep. of Germany

[21] Appl. No.: 465,010

[22] Filed: Feb. 8, 1983

[30] Foreign Application Priority Data

Feb. 19, 1982 [DE] Fed. Rep. of Germany ....... 3205995

[51] Int. Cl.$^3$ .............................................. C08G 75/14
[52] U.S. Cl. .................................... 528/388; 528/373
[58] Field of Search ................................. 528/388, 373

[56] References Cited

U.S. PATENT DOCUMENTS

| | | | |
|---|---|---|---|
| 4,038,259 | 7/1977 | Campbell et al. | 528/388 |
| 4,038,260 | 7/1977 | Campbell | 528/388 |
| 4,038,261 | 7/1977 | Crouch et al. | 528/388 |
| 4,038,262 | 7/1977 | Edmonds | 528/388 |
| 4,038,263 | 7/1977 | Edmonds et al. | 528/388 |
| 4,039,518 | 8/1977 | Campbell | 528/388 |

OTHER PUBLICATIONS

English Language Abstract Japanese Document Number 5554 330, Apr. 1980.

*Primary Examiner*—Harold D. Anderson
*Attorney, Agent, or Firm*—Connolly and Hutz

[57] ABSTRACT

The invention relates to a process for the preparation of polyarylene sulphides in alkylated polyureas at a temperature of 250° to 290° C. under a pressure from 4 to 50 bars.

4 Claims, No Drawings

PROCESS FOR THE PRODUCTION OF POLYARYLENE (SULPHIDES) HAVING AN INCREASED THERMAL AND CHEMICAL RESISTANCE AND AN IMPROVED COLOR QUALITY

Polyarylene sulphides are known (see U.S. Pat. Nos. 2,538,941 and 2,513,188). They may be produced from the corresponding halogen aromatic compounds and alkali metal or alkaline earth metal sulphides. It is possible to work in bulk according to the process described in U.S. Pat. No. 3,354,129 to obtain monomeric and polymeric sulphides by reacting at least one cyclic compound which contains a double bond between adjacent ring atoms and which is at least substituted by a halogen atom, with an alkali metal sulphide in a polar solvent, such as an amide, lactam or sulphone at elevated temperature. Polyhalogen compounds may be used as branching agents.

DE-AS No. 2,453,749 claims carboxylates as reaction accelerators and also claims organic thio compounds as sulphur donors, in addition to alkali metal sulphides.

According to DE-OS No. 2,623,363 or U.S. Pat. No. 4,038,261, lithium chloride or lithium carboxylate are used as catalysts for the production of arylene sulphide polymers. N-methyl-pyrrolidone and alkali metal hydroxides complete the catalyst system.

According to U.S. Pat. No. 4,038,259, alkali metal carbonates combined with alkali metal carboxylates and, according to U.S. Pat. No. 4,038,263, lithium halides are used as catalysts for the production of polyphenylene sulphides.

According to DE-OS No. 2,623,362 or U.S. Pat. No. 4,038,262, lithium halides or alkali metal carboxylates are used as catalysts for the production of arylene sulphide polymers. N-methyl-pyrrolidone and alkali metal hydroxides complete the catalyst system.

According to DE-OS No. 2,623,333 or U.S. Pat. No. 4,046,114 lithium acetate is used as a catalyst for the production of arylene sulphide polymers. N-Alkylpyrrolidones and alkali metal hydroxides and/or alkali metal carbonates optionally as bases complete the catalyst system.

U.S. Pat. No. 4,038,260 claims the use of alkali metal sulphonates and U.S. Pat. No. 4,039,518 claims the use of lithium carbonate and lithium borate.

In DE-OS No. 2,623,333, dehydration, which is usually carried out in the polar solvent before the reaction with dihalogen aromatic compounds, is performed in two stages. In the first stage, the hydrate of the lithium acetate catalyst is dehydrated followed by, in the second stage, the dehydration of the sodium sulphide hydrate.

According to JA-Pat. No. 55-54330, linear polyphenylene sulphide is produced by using a solvent mixture which essentially uses 1,3-dimethyl-2-imidazolidinone (N,N'-dimethyl-ethylene urea) (claim 3 of the Japanese Patent publication). N-Methylpyrrolidone is preferably used as a solvent component. The reaction temperature of the process ranges from 220° to 225° C.

However, when 1,3-dimethyl-2-imidazolidinone is used on its own, the yield is not as good as when N-methylpyrrolidone is used on its own. Likewise, the intrinsic viscosity of the resulting polyphenylene sulphide is lower when 1,3-dimethyl-2-imidazolinone is used on its own than when N-methylpyrrolidone is used on its own. (See the Examples and curves in the above-mentioned Japanese patent publication 55-54330).

In contrast thereto, it has now been found that branched polyarylene sulphides having an increased chemical and thermal resistance and an improved colour quality are obtained when dihalogen benzenes are condensed in a known manner with tri- and/or tetrahalogen benzenes and alkali metal sulphides or alkaline earth metal sulphides in a cyclic urea which is completely alkylated at the nitrogen atom, preferably N,N'-dimethylethylene urea as co-solvent.

In this process, it was even more surprising that not only was a higher yield achieved in N,N'-dimethylethylene urea, compared to that in N-methylpyrrolidone or in a mixture of these two solvents, but that the product also has a substantially higher thermal and chemical resistance, compared to the products according to JA-Pat. No. 55-54330. It could not be expected that by changing the procedural parameters and by adding branching agents, the polyarylene sulphide production would undergo a decisive improvement precisely in pure N,N'-dimethylethylene-urea, compared to the solvent mixture.

Thus, the present invention provides a process for the production of branched polyarylene sulphides from:
(a) dihalogen benzenes, from 50 to 100 mol % of which correspond to formula (I)

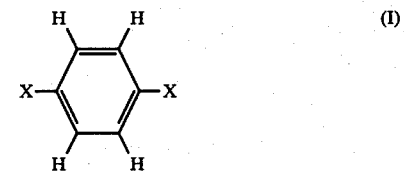

and from 0 to 50 mol % correspond to formula (II):

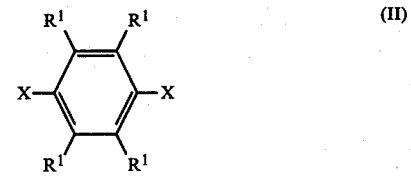

wherein
X is the same or different in each position and rerepresents fluorine, chlorine, bromine and iodine, preferably chlorine and bromine, and
$R^1$ is the same or different in each position, and may represent hydrogen, $C_1$–$C_{20}$ alkyl, $C_5$–$C_{20}$ cycloalkyl, $C_6$–$C_{24}$ aryl, $C_7$–$C_{24}$ alkaryl or $C_7$–$C_{24}$ aralkyl, and/or two radicals $R^1$ may be joined to complete an aromatic or heterocyclic ring, and at least one radical $R^1$ is always different from hydrogen
(b) from 0.2 to 2.4 mol %, preferably from 0.4 to 2.0 mol %, based on the dihalogen benzenes, of a tri- or tetrahalogen aromatic compound corresponding to formula (III):

wherein
Ar represents an aromatic or heterocyclic radical having from 6 to 24 carbon atoms,
X is as defined in formulae (I) and (II), and
n represents 3 or 4, and (c) alkali metal sulphides, preferably sodium or potassium sulphide or a mixture thereof, preferably in the form of the hydrates or aqueous mixtures, optionally together with alkali metal hydroxides the molar ratio of (a+b):c ranging from 0.85:1 to 1.15:1, preferably from 0.95:1 to 1.05:1, in (d) cyclic urea which is completely alkylated at the nitrogen atom, preferably N,N'-dimethylethylene urea, the molar ratio of (c) to (d) ranging from 1:2 to 1:15, optionally with the simultaneous use of catalysts during conventional reaction times, characterised in that a reaction temperature of from 250° to 290° C., preferably from 265° to 285° C., is observed and pressures of from 4 to 50 bars, preferably from 4 to 20 bars, are used.

The type and quantity of alkali metal sulphides to be used corresponds to the prior art. For example, lithium, sodium, potassium and rubidium sulphide are sulphide are suitable, and sodium and potassium sulphide are preferred. LiOH, NaOH and KOH are mentioned as alkali metal hydroxides which are optionally to be used to regenerate the alkali metal sulphides. In both cases, mixtures of the sulphides and of the hydroxides may also be used.

The alkali metal sulphides may be dehydrated in one or more steps, for example by distilling off the water from the reaction solution. Partial dehydration should be completed before the addition of the p-dihalogen compounds corresponding to formulae (I) and (II).

In principle, the reactants may be introduced in any manner. The p-dihalogen aromatic compounds corresponding to the formulae (I) and (II) and the polyhalogen aromatic compounds corresponding to the formula (III) may be added together or separately, continuously, in portions or directly all at once to the alkali metal sulphide, to the solvent or to a part thereof.

However, it is also possible to add the alkali metal sulphide together with the solvent or with a part thereof to the compounds corresponding to formulae (I) and (II) and to the polyhalogen aromatic compounds (III). All the reactants may also be directly added together. Any other combination of the reactants is also possible.

Examples of the p-dihalogen aromatic compounds corresponding to formula (I) which are to be used according to the present invention include the following: p-difluorobenzene, p-dichlorobenzene, p-dibromobenzene, p-diiodobenzene, 1-fluoro-4-chlorobenzene, 1-fluoro-4-bromobenzene, 1-chloro-4-bromobenzene, 1-chloro-4-iodobenzene and 1-bromo-4-iodobenzene. They may be used on their own or mixed together.

Examples of the p-dihalogen aromatic compounds corresponding to formula (II) which are to be used according to the present invention include the following: 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,6-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene and 1-hexyl-2,5-dichlorobenzene. They may be used on their own or mixed together.

Examples of the tri- or tetrahalogen aromatic compounds corresponding to formula (III) which are to be used according to the present invention include the following: 1,2,3-trichlorobenzene, 1,2,4-trichlorobenzene, 1,2,4-tribromobenzene, 1,2,4-tri-iodobenzene, 1,3,5-trichloro-2,4,6-trimethylbenzene, 1,2,3-trichloronaphthalene, 1,2,4-tri-chloronaphthalene, 1,2,6-trichloronaphthalene, 2,3,4-trichlorotoluene, 2,3,6-trichlorotoluene, 1,2,3,4-tetrachloronaphthalene, 1,2,4,5-tetrachlorobenzene, 2,2',4,4'-tetrachlorobiphenyl and 1,3,5-trichlorotriazine.

Di, tri- and tetrahalogen aromatic compounds may be added simultaneously or separately to the reaction phase.

In general, the solvent to be used is any cyclic urea which is completely alkylated at the nitrogen atom and which ensures a sufficient solubility of the organic or inorganic reactants under the reaction conditions.

Within the context of the present invention, cyclic ureas corresponding to formula (IV) are preferably used as the solvent:

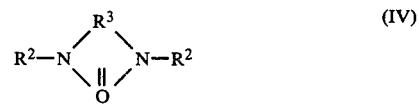

wherein
R² may be the same or different in each position, and represents a C₁–C₄ alkyl radical, preferably methyl, and
R³ represents an ethylene or propylene radical, preferably an ethylene radical which may also be substituted.

N,N'-Dimethylethylene urea and N,N'-dimethylpropylene urea are mentioned as examples.

Mixtures of the cyclic ureas may also be used. The quantity of cyclic urea to be used according to the present invention is from 2 to 15 moles per mol of alkali metal sulphide.

Suitable catalysts include the following, for example: lithium acetate, alkali metal phosphate, alkali metal phosphonate and alkali metal fluoride.

The reaction may last for up to 10 hours, but preferably ranges from 0.2 to 5 hours. A stepwise increase of the reaction temperature during this time is advantageous.

The pressures to be used are generally built up in an autoclave by the reaction mixture, but an excess pressure may also be produced by an inert gas.

Working up the reaction mixture and isolating the polyarylene sulphides may be carried out in various ways.

The polyarylene sulphide may be immediately separated from the reaction solution or may only be separated after adding water and/or dilute acids for example, according to a conventional method, for example by filtration or centrifugation.

A wash with water generally follows filtration to remove inorganic constituents which may adhere to the polymers, for example remnants of alkali metal sulphides and alkali metal chlorides.

A wash or extraction with other washing liquids which may also be carried out in addition to or after this wash is naturally also possible.

The polymer may also be obtained by drawing off the solvent from the reaction chamber and by a subsequent wash, as described above.

The polyarylene sulphides according to the present invention may also be mixed with other polymers, with pigments and fillers, for example graphite, metal powder, glass powder, quartz powder or glass fibres, or may be mixed with additives which are conventional for polyarylene sulphides, for example conventional stabilisers or mould-release agents.

The polyarylene sulphides of the present invention have a substantially higher chemical and thermal resistance and an improved colour quality compared to standard types. Also, at very high temperatures, for example at 290° C., they hardly exhibit any decomposition under pressure in solvents, such as N-methylpyrrolidone, and therefore may be used as, for example, high temperature-resistant coating materials.

COMPARATIVE EXAMPLE 1

This Example describes the production of polyphenylene sulphide according to U.S. Pat. No. 3,354,129 for comparison purposes.

129 g of sodium sulphide-trihydrate (corresponding to 1 mol of $Na_2S$) and 300 g of N-methyl-2-pyrrolidone were introduced together into a stirrer-equipped autoclave. The mixture was flushed with nitrogen and was slowly heated to 202° C. During this operation, a total of 19 ml of water distilled off. The mixture was then cooled to about 160° C. and 147 g of p-dichlorobenzene (=1 mol) in about 50 g of N-methyl-2-pyrrolidone were added. The reaction mixture is heated to 245° C. over a period of 30 minutes under an initial nitrogen pressure of 2.5 bars, the pressure rising to 10 bars, and this temperature is maintained for 3 hours. After cooling to room temperature, a grey solid material is isolated which is then subjected to a careful water wash to remove the inorganic impurities. The material is dried at 80° C. under vacuum and 100.3 g (93%) of light brown poly-p-phenylene sulphide are obtained.

COMPARATIVE EXAMPLE 2

This Example describes the production of polyphenylene sulphide according to JA-Pat. No. 55-54330 (Asahi Dow K.K. 21.4.1980), Example 1, for comparison.

36.04 g of sodium sulphide-nonahydrate, 100 ml of N,N'-dimethylethylene urea and 50 ml of N-methylpyrrolidone were weighed into a 500 ml reaction vessel having an $N_2$ inlet and a gas phase outlet. The mixture was flushed with nitrogen and slowly heated to 200° to 225° C. 25.9 g of distillate which mainly consisted of water were obtained during this operation. After cooling the reaction vessel. 22.05 g of p-dichlorobenzene were added. The mixture was heated to 220° to 225° C. under normal pressure and with $N_2$ flushing. After 4 hours, the reaction mixture was emptied into about 500 ml of methanol and the product was separated by filtration. The crude product was washed for 4 hours in about 1 liter of distilled water at 70° C. After filtration, it was washed for 2 hours in 200 ml of methanol at about 50° C., filtered and dried under vacuum at 100° C. The poly-p-phenylene sulphide weighed 11.79 g (72.5%). It was light grey in colour.

COMPARATIVE EXAMPLE 3

This Example describes the production of poly-p-phenylene sulphide according to JA-Pat. Nos. 55-54330 (Ashai Dow K.K. of 21.4.1980) Example 2, for comparison.

A mixture of 36.06 g of sodium sulphide-nonahydrate, 150 ml of N,N'-dimethylethylene urea and 22.15 g of p-dichlorobenzene were reacted as in Comparative Example 2 and worked up. 9.39 g (57.9% yield) of light grey poly-p-phenylene sulphide were obtained.

EXAMPLE 1

A mixture of 143.5 of sodium sulphide-trihydrate and 5.7 g of NaOH was heated to 185° C. in 450 ml of N,N'-dimethylethylene urea. 64 ml of distillate which substantially consisted of water condensed during this operation. After adding 160.2 g of p-dichlorobenzene and 4.0 g of 1,2,4-trichlorobenzene, the mixture was heated to 270° C. for six hours in an autoclave. After cooling, the mixture was introduced into about 1 liter of distilled water and heated to 100° C. for 2 hours. The product was then obtained by filtration. The p-polyphenylene sulphide was washed with about 500 ml of ethanol and methylene chloride and then dried under vacuum at 120° C. The white product weighed 111.4 g (94.7% yield). Therefore, according to the process of the present invention, a higher yield is achieved simultaneously with an improved colour compared to the process of JA-Pat. No. 55-54330 or to U.S. Pat. No. 3,354,129. As will be shown by the following Examples, the chemical and thermal resistance is also substantially increased.

COMPARATIVE EXAMPLE 4

The procedure was as in Example 1 above, but with 300 ml of N,N'-dimethylethylene urea and 150 ml of N-methyl-pyrrolidone as solvent. 97.2 g (82.6% yield) of light grey product are obtained.

COMPARATIVE EXAMPLE 5

48 g of p-polyphenylene sulphide which was produced according to Comparative Example 1 were heated to 290° C. for 2 hours in 400 ml of N-methylpyrrolidone. Working up produced 9.3 g of residual polymer, and 84.5% had split into soluble products.

COMPARATIVE EXAMPLE 6

The procedure was as in Comparative Example 5, but in 400 ml of N,N'-dimethylethylene urea. The polymer had completely decomposed, and only soluble cleavage products were obtained.

COMPARATIVE EXAMPLE 7

48 g of p-polyphenylene sulphide which was produced according to Comparative Example 2 were heated to 290° C. for 2 hours in 400 ml of N,N'-dimethylethylene urea. Working up produced 24.3 g of residual polymer, and 49.1% was split into soluble constituents.

COMPARATIVE EXAMPLE 8

48 g of p-polyphenylene sulphide, produced according to Comparative Example 3, were heated to 290° C. for 2 hours in 400 ml of N,N'-dimethylethylene urea. Working up produced 25.1 g of residual polymer and 47.7% was split into soluble consistuents.

COMPARATIVE EXAMPLE 9

48 g of p-polyphenylene sulphide, produced according to Comparative Example 4, were heated to 290° C. for 2 hours in 400 ml of N,N'-dimethylethylene urea. Working up produced 27.3 g of residual polymer. 43.1% was split into soluble constituents.

COMPARATIVE EXAMPLE 10

The procedure was as in Comparative Example 9, but in 400 ml of N-methylpyrrlidone. 28.7 g of polymer were recovered and 40.2% had split into soluble products.

EXAMPLE 2

48 g of polyarylene sulphide which was produced according to Example 1 were heated to 290° C. for 2 hours in 400 ml of N,N'-dimethylethylene urea. 44.7 g of polymer were recovered. 93.2% of polyarylene sulphide was obtained in unchanged form.

EXAMPLE 3

The procedure was as in Example 2, but with 400 ml of N-methyl-pyrrolidone as solvent. 46.2 g of polymer were recovered and 96.2% of polyarylene sulphide was obtained in unchanged form.

We claim:

1. A process for the production of a high molecular weight, branched polyarylene sulphide which comprises reacting (a) at least one dihalogen benzene, from 50 to 100 mol % of which corresponds to the formula

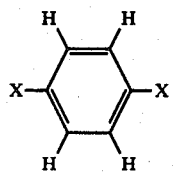

and from 0 to 50 mol % of which corresponds to the formula

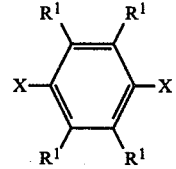

wherein X represents fluorine, chlorine, bromine or iodine, and each $R^1$ is the same or different and represents hydrogen, $C_1$–$C_{20}$ alkyl, $C_5$–$C_{20}$ cycloalkyl, $C_6$–$C_{24}$ aryl, $C_7$–$C_{24}$ alkaryl or $C_7$–$C_{24}$ aralkyl or two adjacent radicals are joined to complete an aromatic or heterocyclic ring and the other two $R^1$ radicals are either joined to complete an aromatic or heterocyclic ring or are each hydrogen, or the aforesaid alkyl, cycloalkyl, aryl, alkaryl or aralkyl radicals, at least one radical $R^1$ being other than hydrogen, (b) from 0.2 to 2.4 mol % based on (a) of a compound of the formula $ArX_n$ wherein Ar represents an aromatic or heterocyclic radical having from 6 to 24 carbon atoms, X is as aforesaid and n is 3 or 4 and (c) at least one alkali metal sulphide, or a mixture thereof with an alkali metal hydroxide, the mol ratio of (a+b):c being from 0.85:1 to 1.15:1, in (d) at least one cyclic urea which is completely alkylated on each nitrogen atom, the mol ratio of (c) to (d) ranging from 1:2 to 1:15, at a temperature of from 250° to 290° C. and a pressure of from 4 to 20 bars.

2. The process of claim 1 wherein (d) is N,N'-dimethylethylene urea, N,N'-dimethylpropylene urea or a mixture thereof.

3. The process of claim 1 wherein said temperature is from 265° to 285° C.

4. The process of claim 1 wherein said pressure is from 4 to 20 bars.

* * * * *